(12) United States Patent
Quast et al.

(10) Patent No.: US 8,123,297 B2
(45) Date of Patent: Feb. 28, 2012

(54) LATCHING FITTING FOR A VEHICLE SEAT

(75) Inventors: Ingo Quast, Coburg (DE); Jochen Hofmann, Marktgraitz (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 303 days.

(21) Appl. No.: 12/466,215

(22) Filed: May 14, 2009

(65) Prior Publication Data
US 2009/0284063 A1 Nov. 19, 2009

(30) Foreign Application Priority Data

May 16, 2008 (DE) .......................... 10 2008 024 020

(51) Int. Cl.
*B60N 2/02* (2006.01)

(52) U.S. Cl. ................. 297/366; 297/367 R; 297/378.1; 74/461; 74/577 M

(58) Field of Classification Search .................. 297/366, 297/367 R, 378.1, 378.12; 74/575, 577 R, 74/577 M, 461, 457, 459.5
See application file for complete search history.

(56) References Cited

U.S. PATENT DOCUMENTS 5,328,241 A * 7/1994 Haider ...................... 297/367 R
(Continued)

FOREIGN PATENT DOCUMENTS

DE 198 45 698 A1 4/2000
(Continued)

OTHER PUBLICATIONS

German Search Report for DE 10 2008 024 020.6, dated Aug. 5, 2009, 4 sheets.

*Primary Examiner* — Laurie Cranmer
(74) *Attorney, Agent, or Firm* — Christie, Parker & Hale, LLP

(57) ABSTRACT

A latching fitting for a vehicle seat for releasably locking a first part and a second part that are movable with respect to each other, particularly for adjusting and locking a backrest part with respect to a seat part of the vehicle seat, includes a pawl connected to the first part. The pawl is pivotable about a pawl bearing and includes a latching toothing which in a locked state of the latching fitting engages into a counter latching toothing of a locking piece connected to the second part. The latching toothing of the pawl and the counter latching toothing of the locking piece include different tooth shapes along the radial direction, such as a trapezoid shape and a triangle shape corresponding to each other.

8 Claims, 3 Drawing Sheets

U.S. PATENT DOCUMENTS

| | | | |
|---|---|---|---|
| 5,718,481 A * | 2/1998 | Robinson | 297/367 R |
| 6,273,508 B1 * | 8/2001 | Lange | 297/378.12 |
| 6,659,558 B2 * | 12/2003 | Sugimoto | 297/367 R |
| 6,688,695 B2 * | 2/2004 | Pleskot | 297/366 |
| 6,860,560 B2 * | 3/2005 | Chiu et al. | 297/367 R |
| 7,325,874 B2 * | 2/2008 | Zhang | 297/336 |

FOREIGN PATENT DOCUMENTS

| | | |
|---|---|---|
| DE | 101 23 800 A1 | 11/2002 |
| DE | 103 12 114 A1 | 10/2004 |

* cited by examiner

LATCHING FITTING FOR A VEHICLE SEAT

CROSS-REFERENCE TO RELATED APPLICATIONS

This application claims the priority of German Patent Application 10 2008 024 020.6 which is incorporated herein by reference.

BACKGROUND OF THE INVENTION

The invention relates to a latching fitting for a vehicle seat for releasably locking two parts that can be moved relative to one another according to the preamble of claim 1, particularly for adjusting and locking a backrest part with respect to a seat part of the vehicle seat.

From DE 198 45 698 A1 a locking device for adjusting fittings on vehicle seats is known that comprises a latching area having a toothing and a latching member having a counter toothing, wherein the toothing and the counter toothing can be brought into and out of engagement and are lockable in an engagement position. In the engagement position the tooth heads of the toothing and counter toothing keep a distance between their apex and the corresponding tooth feet of the respective opposing elements, while the corresponding toothings butt against the tooth flanks. The tooth flanks are connected to the apex via a curved transition region starting at their head sided ends.

Under high loads, for instance in case of a crash, the danger exists that the latching toothing of the latching element connected to one of the parts gets out of engagement with the counter latching toothing of the locking piece connected to the other part. In order to provide, under perpetuation of the essential dimensions of the latching area and the latching member, a higher security of the locking in case of a crash by means of changing the tooth shape at the tooth head region alone, the connecting area lying at the end of the tooth flanks is displacedly arranged towards the tooth foot of the opposing element between the tooth flank and the transition region by means of a reduction of the transition radius, so that an enlargement of the tooth flank covering results while having unmodified toothing relations otherwise, which tooth flank covering keeps the toothing in engagement, even in case of the attack of higher loads that lead to a stronger deformation of the loaded parts.

From DE 101 23 800 A1 an inclination adjusting fitting for the backrest of a motor vehicle seat is known in case of which a first fitting part is firmly connected to the seat part and a second fitting part is connected to the backrest part, wherein the seat part and the backrest part are pivotably connected about a common pivoting axis and the backrest part is pivotably supported on the seat part about an axis running parallel to the pivoting axis and is secured in a latching position by means of a locking pawl, in which latching position a toothing of the second fitting part engages a counter toothing of the first fitting part. In order to design the inclination adjusting fitting in a crash-proof manner out of a few parts, so that the toothings being in engagement with each other are evenly loaded and stay in engagement even in case of a crash, the engagement angle of the tooth flanks absorbing load in case of a crash decreases at the toothing of the second fitting apart and at their complementary counter toothing with increasing distance to the axis of the second fitting apart running parallel to the pivoting axis.

In case of a latching fitting of the aforementioned kind it is essential that in the locking position of the latching fitting the engaged toothing and counter toothing of the latching member stay in engagement even in case of a crash, so that the mutual locking of seat and backrest part is guaranteed and the toothing engagement of the latching toothing into the counter latching toothing is as possible play-free, in order to guarantee a fixed relative position of the parts of the vehicle seat relatively movable and to avoid flapper sounds, particularly in case of an unoccupied vehicle seat.

The problem underlying the invention is to make the toothing engagement of the latching toothing into the counter latching toothing play-free and to avoid that the toothings of the latching toothing and the counter latching toothing are separated from one another in case of a crash.

SUMMARY OF THE INVENTION

According to the invention, this problem is solved in that the latching toothing of the pawl and the counter latching toothing of the locking piece comprise different tooth shapes in the radial direction.

The solution according to the invention guarantees that the toothing engagement of the latching toothing into the counter latching toothing takes place in a play-free manner while at the same time it is avoided that the toothings of the latching toothing and the counter latching toothing are separated from one another in case of a crash.

By means of the tooth shapes or tooth geometries of the intermeshing latching toothing and counter latching toothing that are different with respect to the radial direction, but adjusted with respect to each other, the premise for providing a tooth shape that is optimal with respect to a play-free making of the toothing engagement of the latching toothing into the counter latching toothing as well as for deflecting crash forces is established without having to increase the installation space of the latching fitting.

Preferably, the latching toothing of the pawl and the counter latching toothing of the locking piece comprise in sections a trapezoid shape and a triangle shape corresponding to each other.

In this embodiment the triangle shape of the latching toothing and the counter latching toothing serves for play-free making, while the trapezoid shape of the latching toothing and the counter latching toothing serves for a directed deflection of forces in case of a crash.

Particularly, the latching toothing of the pawl comprises in a section adjacent to the pawl bearing a trapezoid shape and in a section adjacent thereto a triangle shape, while the counter latching toothing of the locking piece comprises in a section adjacent to the pawl bearing a trapezoid shape, in a section remote from the pawl bearing a triangle shape, and in a section between a combined trapezoid and triangle shape.

In this embodiment, the triangle shape of the latching toothing and the counter latching toothing serves for play-free making, while the trapezoid shape serves for directed deduction of the forces acting onto the toothings in case of a crash. The teeth arranged in the area of the counter latching toothing lying in-between having combined triangle and trapezoid shape fulfill the function of play-free making as well as directed deduction of forces in case of a crash depending on the relative position or latching position in which the locking piece and the pawl reside.

According to a further feature of the invention, the number of teeth and/or number of tooth interspaces of the latching toothing deviate from the one of the counter latching toothing, particularly, the number of teeth and/or number of tooth interspaces of the counter latching toothing is larger than the number of teeth of the latching toothing.

Due to the deviating number of teeth and/or number of tooth interspaces of the latching toothing and the counter latching toothing it is guaranteed that in each relative position of the latching toothing and the counter latching toothing a complete latching engagement takes place upon latching of the pawl with the locking piece.

Preferably, the number of teeth and tooth shape of the latching toothing and the counter latching toothing are adjusted with respect to each other in such a manner that in a first relative position of the latching toothing and the counter latching toothing a triangle-shaped tooth of the latching toothing engages into a trapezoid-shaped tooth interspace of the counter latching toothing at at least one tooth interspace flank, and in a second relative position of the latching toothing and the counter latching toothing a tooth of the counter latching toothing comprising a combined trapezoid and triangle shape engages into a trapezoid-shaped tooth interspace of the latching toothing at at least one tooth interspace flank.

In order to guarantee an even and coincidental toothing engagement of the latching toothing and counter latching toothing upon latching of the pawl with the locking piece despite the radial displacement of the pawl bearing and the pivoting of the latching toothing about the pawl bearing with respect to the latching toothing effected thereby, the tooth height of the latching toothing and the counter latching toothing increases starting from the teeth of the latching toothing and the counter latching toothing adjacent to the pawl bearing.

By means of an arrester bushing connected to the first part, which arrester bushing is arranged in the driving direction of the motor vehicle behind the pawl bearing, it is guaranteed that the pawl is supported on the arrester bushing in case of a frontal crash and therewith a removal of the toothing engagement between the latching toothing and the counter latching toothing with the consequence that the second part locked with the first part is moved in an uncontrollable manner, is avoided.

DESCRIPTION OF EMBODIMENTS OF THE INVENTION

Figure 1:
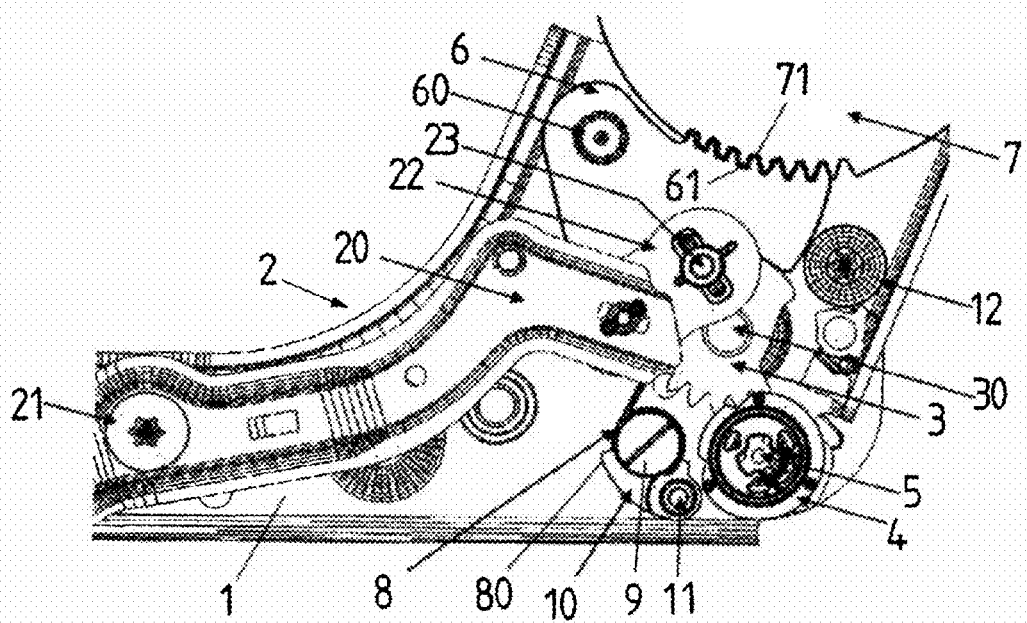
FIG. 1 shows a partial view of a latching fitting for releasably locking two parts of a vehicle seat movable with respect to each other having a pawl connected to one of the parts and a locking piece connected to the other part, whose toothings for locking and unlocking of the latching fitting interact.

By means of an embodiment shown in the drawing, the principle underlying the invention shall be explained in more detail.

The latching fitting for a vehicle seat according to the invention serves for releasably locking of two parts movable with respect to each other in a crash-proof manner, particularly for adjusting and locking a backrest with respect to a seat part of the vehicle seat.

FIG. 1 shows a partially depicted vehicle seat having a seat part having a seat part frame 1. The fold-away backrest not shown is attached to supporting seat part frame 1 via latching fittings attached on both sides of the seat part such that it is hinged on both sides about backrest fold axes. For releasably locking the seat part with the backrest not shown, the latching fitting depicted in FIG. 1 comprises a pawl 6 having a latching toothing 61, which pawl 6 is pivotable at the seat part frame 1 about a pawl bearing 60 and a locking piece 7 connected to the backrest having a counter latching toothing 71. In the orientation shown in FIG. 1 both latching members of the latching fitting, namely the pawl 6 and the locking piece 7 are locked with each other due to engagement of the latching toothing 61 into the counter latching toothing 71.

For controlling the pivoting position of the pawl 6, a tensioning element 3 supported via a tensioning element bearing 30 on the seat part frame 1 is provided, that according to FIG. 1 interacts with a clamping surface 32 with a corresponding control surface 62 and a locking cam 63 of the pawl 6, such that depending on the position of the tensioning element 3 the latching toothing 61 of the pawl 6 locks with the counter latching toothing 71 of the locking piece 7, or such that, for adjusting or for folding forward the backrest, the locking of the latching toothing 61 of the pawl 6 with the counter latching toothing 71 of the locking piece 7 is unmade.

Figure 2:
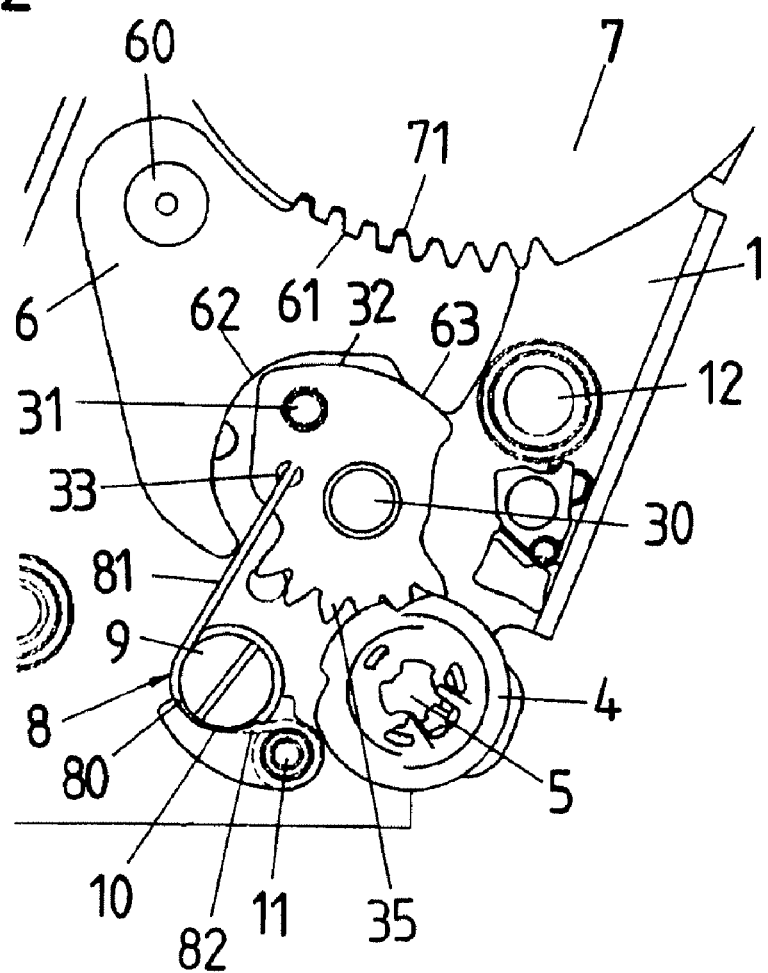
FIG. 2 shows an illustration of the function elements of the latching fitting in the locking position of the pawl and the locking piece.

For controlling the locking and unlocking of the latching fitting, an actuating means 2 is provided that consists of an actuating lever 20 that is supported about a pivoting axis 21 on the seat part frame 1 and extends to an actuating handhold, that is not shown, at the leading edge or the side of the vehicle seat, and a coupling element 22, that is coupled to the actuating lever 20 via a pivoting bolt 24 and that is coupled to the tensioning element 3 via a bearing bolt 23 having a bearing bolt linkage 31 depicted in FIG. 2. Due to the arrangement of the bearing bolt linkage 31 at a distance to the tensioning element bearing 30 of the tensioning element 3, the coupling element 22 is pivoted upon an actuation of the actuating lever 20 and transfers this pivoting onto the tensioning element 3. Upon lifting of the actuating handhold, the tensioning element 3 is thus pivoted for setting free the pawl 6 into the area of the control surface 62 out of the locking position in which the clamping surface 32 of the tensioning element 3 abuts against the locking cam 63 of the control surface 62 of the pivotable pawl 6 without play, so that the locking of the toothing engagement of the latching toothing 61 into the counter latching toothing 71 is unmade and the backrest can be folded forwards.

In order to safely secure the pawl 6 in the self-impeding locking position shown in FIGS. 1 and 2 even in case of dynamic loads of the vehicle seat, the tensioning element 3 is spring-loaded. A spring element provided for this purpose formed as a twister 8 comprises a spring body 80 that is joined to the seat part frame 1 about a spring linkage 9 and abuts against a spring support 10 connected to the seat part frame 1, which spring support 10 serves for supporting the spring body 80 of the twister 8 in order to avoid a displacement of the spring windings against each other, so that mechanical tensions in the spring wire of the twister 8 stay in the admissible region and therewith guarantee a high fatigue resistance of the twister 8 over a very long operating time.

The twister 8 comprises according to FIG. 2 two spring legs 81, 82, from which the first spring leg 81 is hooked into a hooking-in 33 of the tensioning element 3 while the second spring leg 82 is laid around a spring leg bearing 11. The spring hooking-in 33 for housing the angled end of the first spring leg 81 is arranged at a distance to the tensioning element bearing 30 and to the bearing bolt linkage 31.

For connecting the latching fitting shown in FIGS. 1 and 2 to the latching fitting arranged on the opposing side of the vehicle seat, a connecting shaft 5 is provided, that is connected on both sides of the vehicle seat to an adapter 4. The adapter 4 comprises a toothing that intermeshes with a segment toothing 35 of the tensioning element 3 which is arranged on the side facing the clamping surface 32 of the tensioning element 3 with respect to the tensioning element bearing 30. Via the connection of the actuating lever 20, the coupling element 22, the tensioning element 3, the adapter 4 and the connecting shaft 5 to the latching fitting arranged on the opposing side of the vehicle seat, an actuation of the actuating lever 20 is thus also transferred to the opposing latching fitting for its locking and unlocking.

An arrester bushing 12 attached to the seat part frame 1 is positioned such that the side of the pawl 6 facing the linkage of the pawl 6 at the pawl bearing 60 abuts against the arrester bushing 12 without play, so that in case of a crash it is avoided that upon impact of crash forces the latching toothing 61 of the pawl 6 is lifted out of the counter latching toothing 71 of the locking piece 7 and thereby the locking of the backrest with the seat part of the vehicle seat is unmade.

Figure 3:
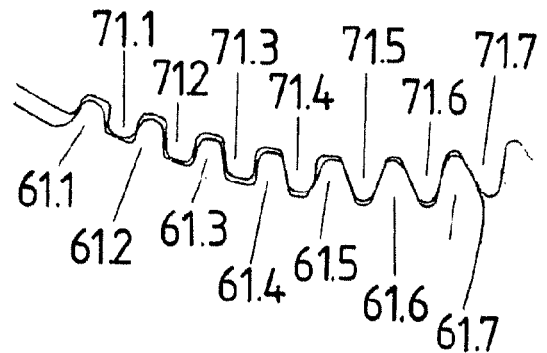
FIG. 3 shows a schematic illustration of the latching toothing of the pawl and the counter latching toothing of the locking piece in a first latching position.
Figure 4:
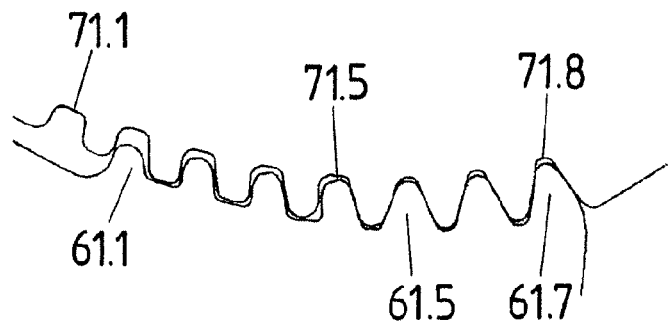
FIG. 4 shows a schematic illustration of the latching toothing of the pawl and the counter latching toothing of the locking piece in a second latching position and FIG. 5 shows a schematic illustration of a latching fitting having an arrester bushing in a locked state upon the impact of frontal crash forces.

In FIGS. 3 and 4 exploded views of the latching toothing 61 of the pawl 6 and the counter latching toothing 71 of the locking piece 7 in different latching positions of the pawl 6 and the locking piece 7 are depicted.

The teeth 61.1 to 61.4 of the latching toothing 61 of the pawl 6 adjacent to the pawl bearing 60 comprise a trapezoidal shape and the teeth 61.5 to 61.7 of the latching toothing 61 adjacent thereto comprise a triangle shape. In this respect, a trapezoid and triangle shape or a trapezoid or triangle-shaped tooth shape means that the tooth shape or tooth geometry comprises a trapezoid or triangle-shaped basic shape which can however be combined with roundings at the tooth head or tooth foot.

The teeth 71.1 to 71.3 of the counter latching toothing 71 of the locking piece 7 adjacent to the pawl bearing 60 also comprise a trapezoid shape that essentially corresponds to the trapezoid shape of the teeth 61.1 to 61.4 of the latching toothing 61. The fourth tooth 71.4 of the counter latching toothing 71 comprises a combined trapezoid and triangle shape which results in a corresponding shape of the following tooth interspace to the fifth tooth 71.5 of the counter latching toothing 71. The teeth 71.5 to 71.7 of the counter latching toothing 71 adjacent thereto are formed as a triangle toothing.

In case of this tooth shape or tooth geometry of the latching toothing 61 and counter latching toothing 71 being different in sections in the radial direction of the toothings 61 and 71, the trapezoid toothing adjacent to the pawl bearing 60 of the latching toothing 61 and counter latching toothing 71 essentially serves for directed deflection of the forces acting onto the toothings 61, 71 in case of a crash, while the triangle toothing 61 and counter latching toothing 71 essentially serve for play-free making of the toothing engagement of the latching toothing 61 into the counter latching toothing 71.

The fourth tooth 71.4 of the counter latching toothing 71 consisting of a combined trapezoid and triangle shape fulfils the function of play-free making as well as the function of directed deflection of forces in case of a crash depending on in which position or latching position the locking piece 7 resides with respect to the pawl 6.

In FIGS. 3 and 4 both possible latching positions of the locking piece 7 with respect to the pawl 6 are depicted and point out that in the latching position depicted in FIG. 3 a triangle-shaped tooth 61.5 of the pawl 6 engages into a combined trapezoid and triangle-shaped tooth interspace of the counter latching toothing 71 between the fourth, combined trapezoid- and triangle-shaped tooth 71.4 and the fifth, triangle-shaped tooth 71.5 of the counter latching toothing 71.

In the latching position depicted in FIG. 4 of the locking piece 7 the trapezoid-shaped tooth 61.4 of the latching toothing 61 engages, in contrast, into the combined trapezoid-triangle-shaped tooth interspace of the counter latching toothing 71 in-between the fourth, combined trapezoid- and triangle-shaped tooth 71.4 and the fifth, triangle-shaped tooth 71.5 of the counter latching toothing 71.

Figure 5:
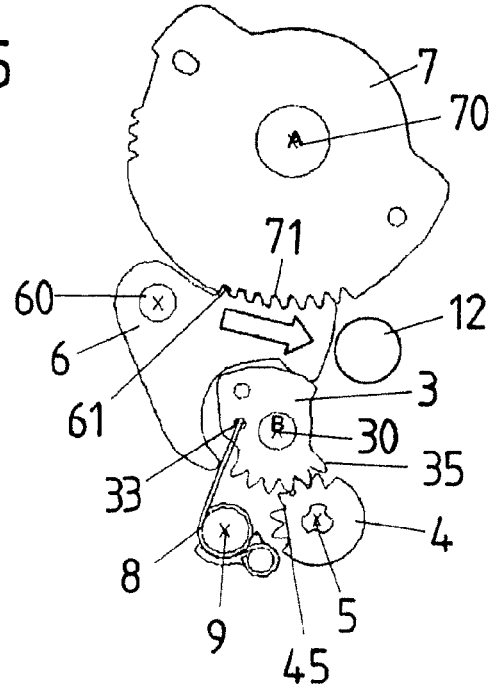

FIG. 5 shows the functioning parts of the latching fitting according to FIGS. 1 and 2 with an arrow illustration of the main force direction that acts onto the latching fitting in case of a crash.

In order to guarantee an even and coincidental toothing engagement of the latching toothing 61 into the counter latching toothing 71 upon latching of the pawl 6 with the locking piece 7, despite the radial displacement of the pawl bearing 60 with respect to the latching toothing 61 and the pivoting of the latching toothing 61 about the pawl bearing 60 caused thereby, the tooth height of the latching toothing 61 and the counter latching toothing 71 increases starting from the teeth of the latching toothing 61 and the counter latching toothing 71 adjacent to the pawl bearing 60.

Due to the trapezoid shape of the first toothing section 61.1 to 61.4 of the latching toothing 61 and 71.1 to 71.3 as well as the combined trapezoid and triangle shape of the fourth tooth 71.4 of the counter latching toothing 71 at the toothing region adjacent to the pawl bearing 60, the impacting crash force is deflected according to FIG. 1 in the direction of the depicted arrow via the pawl bearing 60 and the tensioning element 3 into the arrester bushing 12 into the seat part frame 1 out of the backrest connected to the locking piece 7, wherein this force direction is only active in case of a crash due to the trapezoid toothing.

Since in case of an enlargement of the distance between the rotation axis 70 of the locking piece 7 and the tensioning element bearing 30 the shearing surface of the engaging latching toothing 61 and counter latching toothing 71 is reduced in case of a crash, the arrester bushing 12 causes that this distance is kept constant. Hereby, it is avoided that the force acting from the locking piece 7 onto the pawl 6 decreases in the radial direction and thereby the distance between the rotation axis 70 of the locking piece 7 and the tensioning element bearing 30 is not increased in case of a crash as it would without the trapezoid-shaped tooth shape and arrangement of arrester bushing 12, which is supported in the housing plates of the seat part frame 1 according to FIG. 1. Hereby, plates of reduced thickness between the rotation axis 70 of the locking piece 7 and the tensioning element bearing 30 may be employed, wherefrom a lower material usage, a lower weight and a smaller installation space of the whole latching fitting result.

The invention claimed is:

1. A latching fitting for a vehicle seat for releasably locking a first part and a second part that are moveable with respect to each other, particularly for adjusting and locking a backrest part with respect to a seat part of the vehicle seat, the latching fitting comprising:
  a pawl connected to the first part, wherein the pawl is pivotable about a pawl bearing and comprises a latching toothing, wherein the latching toothing in a locked state of the latching fitting engages along a radial direction into a counter latching toothing of a locking piece connected to the second part;

a tensioning element rotationally movable with respect to the pawl, wherein the tensioning element is supported on the first part and has a clamping surface via which the tensioning element interacts with a corresponding control surface of the pawl between a locking and an unlocking position of the pawl;

a spring element configured to act on the tensioning element; and an actuating device configured to act on the pawl for unlocking and locking the latching fitting;

wherein both the latching toothing of the pawl and the counter latching toothing of the locking piece comprise teeth having different tooth shapes extending in the radial direction and comprise a section in which a tooth geometry of the teeth is of a generally trapezoidal shape and a section in which the tooth geometry of the teeth is of a generally triangular shape, wherein the trapezoidal shaped teeth and the triangular shaped teeth of the latching toothing of the pawl generally correspond to the trapezoidal shaped teeth and the triangular shaped teeth, respectively, of the counter latching toothing of the locking piece.

2. The latching fitting according to claim 1, wherein the section of generally trapezoidal shaped teeth of the latching toothing is located adjacent to the pawl bearing, and wherein the section of generally triangular shaped teeth of the latching teething is located adjacent to the section of generally trapezoidal shaped teeth.

3. The latching fitting according to claim 2, wherein a section of combined trapezoidal and triangular shaped teeth is between the section of generally trapezoidal shaped teeth and the section of generally triangular shaped teeth.

4. The latching according claim 1, wherein at least one of the number of teeth and a number of tooth interspaces of the latching toothing deviates from at least one of the number of teeth and a number of tooth interspaces of the counter latching toothing.

5. The latching fitting according to claim 4, wherein at least one of the number of teeth and the number of the tooth interspaces of the counter latching toothing is greater than at least one of the number of teeth and the number of the tooth interspaces of the latching toothing.

6. The latching fitting according to claim 1, wherein the number of teeth and the tooth shape of the latching toothing and the counter latching toothing are adjusted with respect to each other such that in a first relative position of the latching toothing and the counter latching toothing a triangular shaped tooth of the latching toothing engages a trapezoidal shaped tooth interspace of the counter latching toothing at least one tooth interspace flank, and wherein in a second relative position of the latching toothing and the counter latching toothing a tooth of the counter latching toothing comprising a combined trapezoidal and triangular shape engages into a shaped trapezoidal shaped tooth interspace of the latching toothing at least one tooth interspace flank.

7. The latching fitting according to claim 1, wherein a tooth height of the latching toothing and of the counter latching toothing increases from the teeth of the latching toothing and the counter latching toothing adjacent to the pawl bearing.

8. The latching fitting according to claim 1, wherein the first part comprises an arrester bushing that is arranged in a driving direction of a motor vehicle behind the pawl bearing.

* * * * *

UNITED STATES PATENT AND TRADEMARK OFFICE
CERTIFICATE OF CORRECTION

PATENT NO. : 8,123,297 B2  
APPLICATION NO. : 12/466215  
DATED : February 28, 2012  
INVENTOR(S) : Ingo Quast et al.

Page 1 of 1

It is certified that error appears in the above-identified patent and that said Letters Patent is hereby corrected as shown below:

In the Claims

Column 8, Claim 6, line 17.        After "toothing at"
                                   Insert -- at --

Column 8, Claim 6, line 21.        Delete "shaped"

Column 8, Claim 6, line 22.        After "toothing at"
                                   Insert -- at --

Signed and Sealed this
Twenty-eighth Day of August, 2012

David J. Kappos
*Director of the United States Patent and Trademark Office*